United States Patent
Kowalevicz et al.

(10) Patent No.: US 9,900,031 B2
(45) Date of Patent: Feb. 20, 2018

(54) METHOD AND SYSTEM FOR NON-PERSISTENT COMMUNICATION

(71) Applicant: Raytheon Company, Waltham, MA (US)

(72) Inventors: Andrew Kowalevicz, Arlington, VA (US); Tom Borton, Rockville, MD (US); Michael C. Reese, Fairfax, VA (US); Gary M. Graceffo, Burke, VA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 15/155,490

(22) Filed: May 16, 2016

(65) Prior Publication Data
US 2016/0336977 A1    Nov. 17, 2016

Related U.S. Application Data

(63) Continuation of application No. 14/704,916, filed on May 5, 2015, now abandoned.

(60) Provisional application No. 61/988,418, filed on May 5, 2014, provisional application No. 61/988,423, filed on May 5, 2014, provisional application No.
(Continued)

(51) Int. Cl.
| | | |
|---|---|---|
| H04L 9/08 | (2006.01) | |
| H04B 1/04 | (2006.01) | |
| H04L 9/16 | (2006.01) | |
| H04L 7/06 | (2006.01) | |
| H04L 7/04 | (2006.01) | |
| H04L 25/49 | (2006.01) | |
| H04L 12/26 | (2006.01) | |
| G09C 1/00 | (2006.01) | |

(52) U.S. Cl.
CPC ............ *H04B 1/0475* (2013.01); *G09C 1/00* (2013.01); *H04L 7/042* (2013.01); *H04L 7/065* (2013.01); *H04L 9/08* (2013.01); *H04L 9/16* (2013.01); *H04L 25/4902* (2013.01); *H04L 43/087* (2013.01); *H04L 43/0864* (2013.01)

(58) Field of Classification Search
CPC ...... H04L 7/065; H04L 7/042; H04L 25/4902
See application file for complete search history.

(56) References Cited

U.S. PATENT DOCUMENTS 3,899,772 A * 8/1975 Mead .................. G06F 13/4063
                                                                340/10.51
3,916,307 A * 10/1975 Hekimian .......... H03K 5/00006
                                                                324/76.77
(Continued)

OTHER PUBLICATIONS

"U.S. Appl. No. 14/704,916, Ex Parte Quayle Action mailed Nov. 5, 2015", 8 pgs.
(Continued)

*Primary Examiner* — Jean B Corrielus
(74) *Attorney, Agent, or Firm* — Schwegman Lundberg & Woessner, P.A.

(57) ABSTRACT

A method for carrying data on a live host signal, comprising the steps of: varying timing in a host signal in response to data to be encoded, wherein variations in timing are smaller than a sampling period for detection and capture of the digital signal receiving the live host signal; sensing pulse timing variations in the received live host signal by comparison to a reference signal; and determining information in the sensed timing variations.

23 Claims, 6 Drawing Sheets

Related U.S. Application Data

61/988,416, filed on May 5, 2014, provisional application No. 61/988,409, filed on May 5, 2014.

(56) References Cited

U.S. PATENT DOCUMENTS

| | | | |
|---|---|---|---|
| 4,221,931 A | 9/1980 | Seiler | |
| 4,631,600 A | 12/1986 | Fukui | |
| 5,228,062 A * | 7/1993 | Bingham | H04L 27/2679 375/222 |
| 5,774,508 A | 6/1998 | Kallman et al. | |
| 6,396,877 B1 * | 5/2002 | Hollenbach | H04B 14/06 375/247 |
| 7,133,647 B2 * | 11/2006 | Dent | H04L 7/02 370/505 |
| 7,200,014 B1 * | 4/2007 | Hawkes | H02M 3/28 363/21.1 |
| 7,269,261 B1 | 9/2007 | Jennings | |
| 7,497,637 B2 | 3/2009 | Brandstein | |
| 8,283,911 B1 * | 10/2012 | Bierer | G01R 25/00 324/66 |
| 8,363,774 B2 | 1/2013 | Lin et al. | |
| 8,498,197 B2 | 7/2013 | Kent | |
| 8,717,147 B2 * | 5/2014 | Bae | G06K 7/0008 340/10.1 |
| 9,755,674 B2 | 9/2017 | Graceffo et al. | |
| 2002/0071556 A1 | 6/2002 | Moskowitz et al. | |
| 2004/0125952 A1 | 7/2004 | Alattar et al. | |
| 2005/0135501 A1 * | 6/2005 | Chang | H04J 9/00 375/295 |
| 2005/0286649 A1 | 12/2005 | Redfern | |
| 2006/0239501 A1 | 10/2006 | Petrovic et al. | |
| 2006/0239503 A1 | 10/2006 | Petrovic et al. | |
| 2007/0064849 A1 | 3/2007 | May | |
| 2007/0279784 A1 | 12/2007 | Yamamoto | |
| 2009/0196419 A1 | 8/2009 | Tapster | |
| 2009/0287837 A1 | 11/2009 | Felsher | |
| 2010/0265139 A1 * | 10/2010 | Beadle | G01S 3/14 342/451 |
| 2012/0106380 A1 * | 5/2012 | Vaidyanathan | G01S 1/024 370/252 |
| 2015/0318982 A1 | 11/2015 | Kowalevicz et al. | |

OTHER PUBLICATIONS

"U.S. Appl. No. 14/704,916, Preliminary Amendment dated Jul. 15, 2015", 3 pgs.

"U.S. Appl. No. 14/704,916, Notice of Allowance dated Feb. 18, 2016", 17 pgs.

"U.S. Appl. No. 14/704,916, Response filed Jan. 5, 2016 to Ex Parte Quayle Action mailed Nov. 5, 2015", 6 pgs.

"U.S. Appl. No. 14/704,900, Comments on Reasons for Notice of Allowance dated Jul. 24, 2017", 1 pg.

"U.S. Appl. No. 14/704,900, Final Office Action dated Mar. 15, 2017", 7 pgs.

"U.S. Appl. No. 14/704,900, Notice of Allowance dated Apr. 28, 2017", 9 pgs.

"U.S. Appl. No. 14/704,900, Response dated Dec. 30, 2016 to Non Final Office Action dated Oct. 3, 2016", 8 pgs.

"U.S. Appl. No. 14/704,900, Response dated Apr. 6, 2017 to Final Office Action dated Mar. 15, 2017", 6 pgs.

* cited by examiner

METHOD AND SYSTEM FOR NON-PERSISTENT COMMUNICATION

CROSS REFERENCE TO RELATED APPLICATIONS

This application is a continuation of and claims the benefit of priority to U.S. application Ser. No. 14/704,916, filed May 5, 2015, now abandoned, which claims the benefit of priority to U.S. Provisional Patent Application Ser. No. 61/988,409, filed May 5, 2014, U.S. Provisional Patent Application Ser. No. 61,988,416, filed May 5, 2014, U.S. Provisional Patent Application Ser. No. 61/988,423, filed May 5, 2014, and U.S. Provisional Patent Application Ser. No. 61/988,418, filed May 5, 2014, the benefit of priority of each of which is claimed hereby, and each of which are incorporated herein by reference in its entirety.

The present application, METHOD AND SYSTEM FOR NON-PERSISTENT COMMUNICATION is being filed on the same day as and in conjunction with related applications: pending Ser. No. 14/704,900 entitled METHODS FOR ENCRYPTION OBFUSCATION; Ser. No. 14/704,929 entitled SYSTEM AND METHOD TO DETECT TIME-DELAYS IN NON-PERIODIC SIGNALS, now U.S. Pat. No. 9,698,835; and pending Ser. No. 14/704,923 entitled METHOD AND SYSTEM FOR NON-PERSISTENT REAL-TIME ENCRYPTION KEY DISTRIBUTION, which applications all share some common inventors herewith, and the contents of which are all hereby incorporated herein in their entirety.

FIELD OF THE INVENTION

The present invention generally relates to communication devices, and in particular to such devices which communicate secure information.

BACKGROUND OF THE INVENTION

Often times, when U.S. Diplomats are working outside the continental United States (OCONUS), communications are closely monitored by the visited country. The monitoring is done to identify transmissions that are considered harmful to local governments. When United States personal are operating in these countries, they need to send their information back to the US using encryption to protect their mission. There are, of course, other instances where securely transmitted communications are very useful. The sending of encrypted messages either over-the-air or over a terrestrial link can bring undesired attention to the sender, which could have damaging consequences. Therefore it is useful to have a method for sending secure communications that do not appear to be secure.

SUMMARY OF THE INVENTION

One embodiment of the present invention provides a method for carrying data on a live host signal, comprising the steps of: varying timing in a host signal in response to data to be encoded, wherein variations in timing are smaller than a sampling period for detection and capture of the digital signal; receiving the live host signal; sensing timing variations in the received live host signal by comparison to a reference signal; and determining information in the sensed timing variations.

The variations in timing may be less than 1 picosecond. The host signal may be a digital signal and the timing variations may be pulse timing variations. The variations in pulse timing include variation of a leading edge and a trailing edge of digital pulses. The variations in pulse timing may include variation in pulse width.

The reference signal is a frequency reference having a stability that is better than the level of timing variations of the host signal; and the timing variations of the host signal may be smaller than the a sampling period for detection and capture of the digital signal. The reference signal may have a known variation to which the data to be encoded is added. The host signal may be an analog signal.

BRIEF DESCRIPTION OF THE DRAWINGS

The present invention is illustratively shown and described in reference to the accompanying drawings, in which.

DETAILED DESCRIPTION

The present application presents a method and system for hiding information in a host data stream, using by way of example, Gaussian Clock Dither Modulation (GCDM) with a high stability oscillator (HSO). A host (overt) communications channel is transmitted in the open using the oscillator as a frequency reference. The covert communication is applied to the host signal by modulating the timing on the reference signal of the transmitter to represent the covert (hidden) communication. While the timing variation representing the covert communication is deterministic, it is implemented such that it appears Gaussian in nature and remains within the normal operational levels of timing jitter for a less stable frequency standard of approximately 1 s-10 s of ps. The variation introduced on the clock is applied to the transmittal signals. Depending on the implementation, the variation is seen either on the carrier phase (modified zero crossings) or the data symbol falling edge (modulation of the pulse duration). A receiver using an HSO will see the modulation and will then demodulate it.

One modulation method used is Gaussian Clock Dither Modulation (GCDM). GCDM uses a combination of statistical variation, spread spectrum and direct clock quantization. GCDM does not require making the jitter any worse than that of a typical, high quality, oscillator. Typical jitter in these oscillators is approximately 1 s-10 s of picoseconds (ps). GCDM transmits "Marks" and Spaces" using a Gaussian distributed random variable to determine the amount of jitter to add to each symbol. Using a Gaussian distributed random variable ensures that the jitter looks Gaussian, as jitter is, and keeps the jitter to a deviation commensurate with a well-designed communications system.

Figure 1:
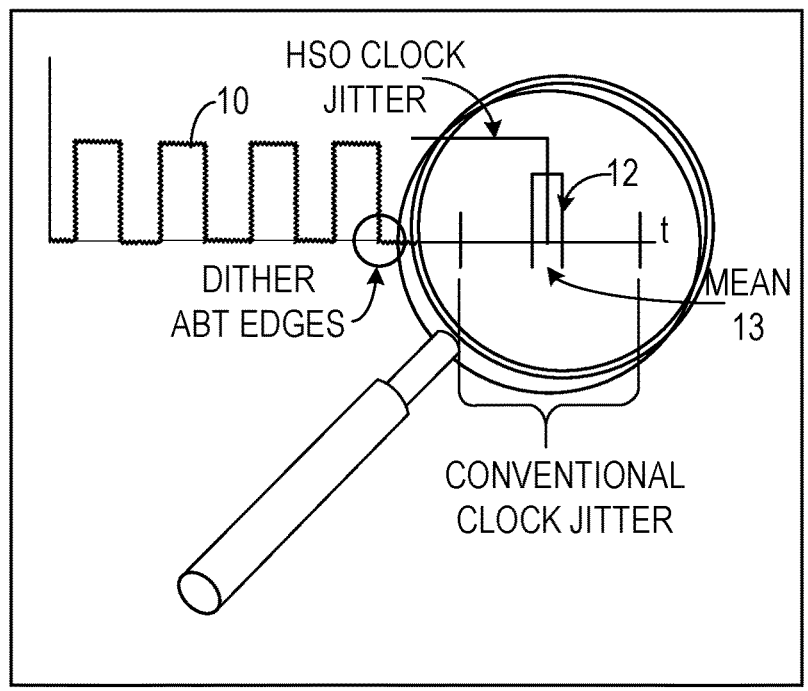
FIG. 1 is a diagram of a nominal waveform demonstrating timing jitter.

All communication systems have jitter. The greater the stability of the system's reference oscillator, the less jitter in the system. Timing jitter is illustrated in FIG. 1. Jitter is defined as the undesired deviation from true periodicity of an assumed periodic signal 10. As shown in FIG. 1, jitter causes the falling edge 12 (or rising edge) of a pulse to jitter about a mean value 13. The mean value is the desired periodicity.

Figure 2:
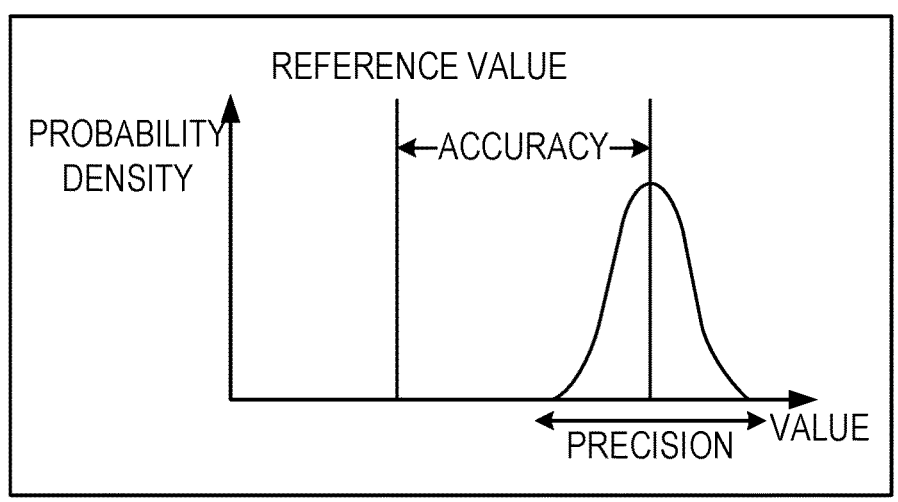
FIG. 2 is a diagram of a waveform demonstrating the difference between accuracy and precision.

For purposes of consistency of terminology, "accuracy" is how close the pulse repetition rate is to a known standard, whereas "precision" is describes the periodicity of the pulse train. The concepts of accuracy and precision are illustrated in FIG. 2. Synonyms used for precision are stability and uncertainty; these two terms are used interchangeably throughout this paper. There is however a subtle difference in the three terms. Precision is an absolute measure such as plus or minus a deviation from the mean. Uncertainty is more appropriate when discussing system performance statistically. Stability is used when one wants to refer to the affect that the precision has on the overall system performance.

In any communication system, the zero crossings of the electrical signals vary and are centered about a mean value, which is the desired periodic interval. The jitter is a result of oscillator instability and has both random and deterministic components. The deterministic component is measureable and is therefore not of concern for this discussion. The random jitter component is Gaussian in nature; it is this property that is exploited for the covert channel.

Some embodiments of the present invention use an HSO having a sufficiently low jitter such that modulation may be added to that inherent instability but still kept below the minimum levels of detection and capture circuitry utilizing a standard reference source.

Figure 3:
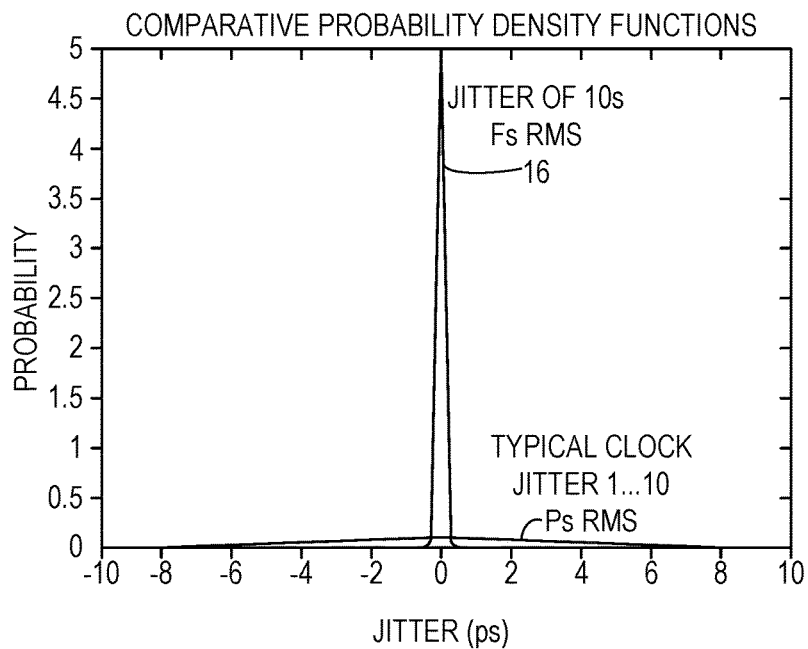
FIG. 3 is a graph of jitter probability.

FIG. 3 shows a graph of jitter 16 from a suitable oscillator. Any suitable highly stable oscillator may be used. An HSO has very low phase noise, with an equivalent timing jitter on the order of femtoseconds (fs), even for very high reference frequencies (GHz), Typical root mean squared (rms) jitter 18 is on the order of 1 s-10 s of picoseconds.

Figure 4:
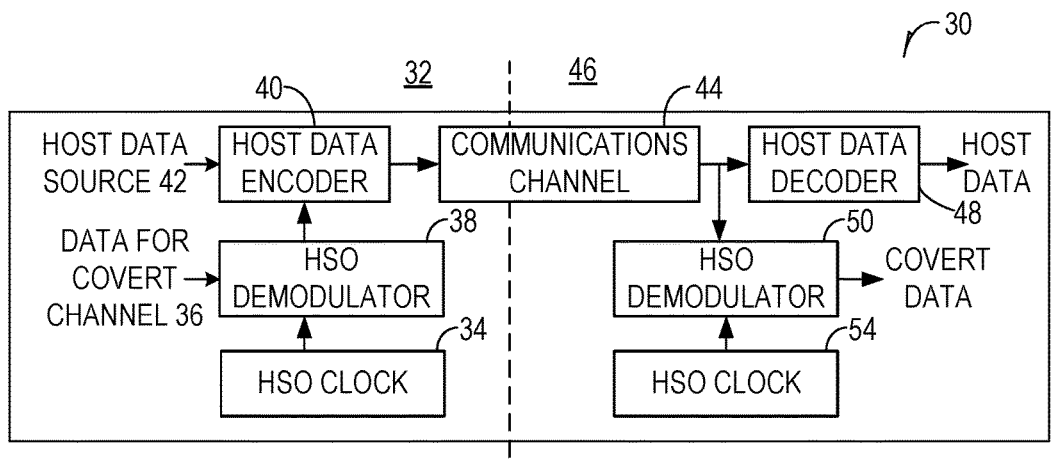
FIG. 4 is a block diagram of a data transmission system according to the present invention.

FIG. 4 shows a block diagram 30 suitable for describing the general operation of a system and method constructed according to the present invention using FIG. 4 shows a block diagram 30 suitable for describing the general operation of a system and method constructed according to the present invention using GCDM. A host communication system 32 uses the output of HSO clock 34 as its primary reference providing the system 32 with an rms timing jitter of ~10 s fs. Host system 32 likely introduces some further jitter. Surreptitious communications of covert data 36 is then affected by modulating the reference clock signal from HSO clock 34 with the covert data 36, in the HSO modulator. The resulting modulated clock signal is then used for sending nominal data via host data encoder 40 from host data source 42 over a communications channel 44. Communications channel 44 can be terrestrial, such as copper and fiber optic, or over-the-air.

On the receive side 46, a Host Data Decoder 48 recovers the host data without any additional processing beyond that required for the transmission type. Signals from communications channel 44 are also coupled to Demodulator 50, which recovers the covert data by reference to an HSO clock 54. Although FIG. 5 shows an HSO clock 34, 54 at both ends of the communications system, it is possible to design a system such that only one HSO is required on the receive side 46.

Figure 5:
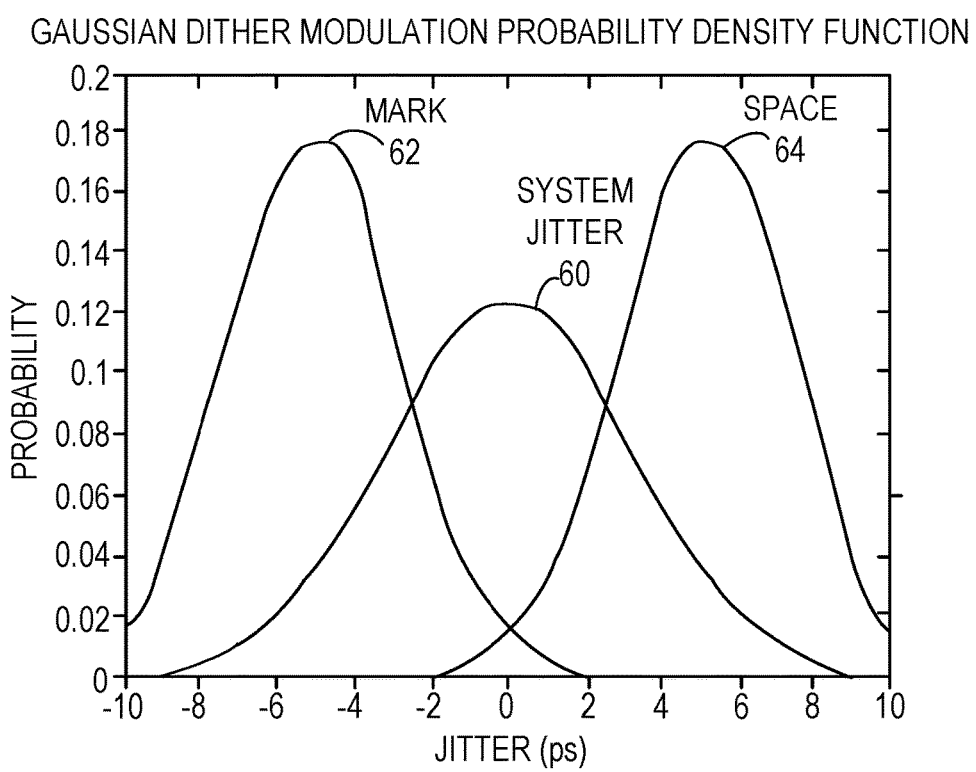
FIG. 5 is a representational graph of timing variations used in a covert communications channel in accordance with one embodiment of the present invention.

FIG. 5 shows a representational graph of the timing variations used in the covert communications channel. The trace 60 in the figure is the probability distribution of a typical oscillator used in a communication system. A "Mark" or a "Space" is transmitted by using a Gaussian random variable to modulate the phase/frequency of the HSO. The location of the "Mark" and "Space" is determined as follows: The full extent of the dither window is divided into two regions. If one assumes for example that the full extent is 20 ps, then the regions are, −10 ps to 0 and 0 to 10 ps, A Mark is then described by a Gaussian random variable with a mean 62 of −5 ps and a standard deviation of 1 ps. Similarly, a "Space" is described by a random variable with a mean 64 of +5 ps and a standard deviation of 1 ps as shown in FIG. 5.

Statistically, there are times that the system's jitter will obscure the signaling in the covert communications channel. To mitigate this problem, the covert signal is spread using a Direct Sequence Spread Spectrum (DSSS) technique. The DSSS signal is a Maximal Length Sequence (TBR) of length 1025 chips (TBR) which provides a process gain of 30 dB (TBR).

In the manner describe above, a method for carrying data on a live host signal, comprises the steps of: varying timing in a host signal in response to data to be encoded, wherein variations in timing are smaller than a sampling period for detection and capture of the digital signal; receiving the live host signal; sensing timing variations in the received live host signal by comparison to a reference signal; and determining information in the sensed timing variations. The variations in timing may be less than 1 picosecond. The host signal may be a digital signal and the timing variations may be pulse timing variations. The variations in pulse timing may include variation of a leading edge, a trailing edge and pulse width of digital pulses and are smaller than the sampling period for detecting and capturing the digital signal. The reference signal may be a frequency reference having a stability that is better than the level of timing variations of the host signal. Although the method is discussed in terms of a digital signal, the principals are also applicable to analog signals.

Following is a discussion of a system and method for measuring variations or deviation from ideal waveform transitions in a received signal to thereby access covert data encoded according to the above described method.

Figure 6A:
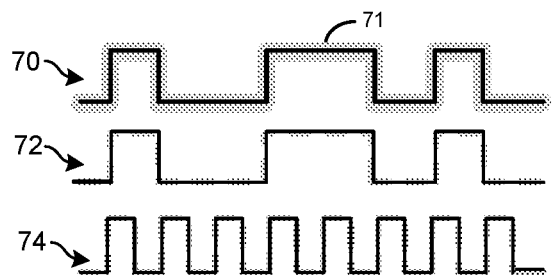
FIGS. 6A and 6B are diagrams of waveforms associated with an embodiment of the present invention.
Figure 6B:
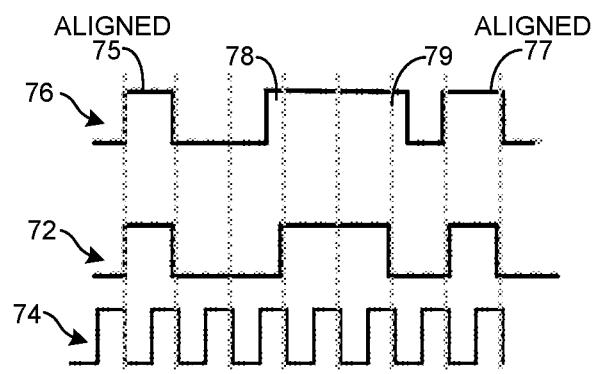

FIG. 6A shows a plot of three digital waveforms 70, 72, 74. Waveform 70 is an example of a digital waveform which has been modulated by the method of the above described invention. Gray or blurred areas 71 represent timing variation or jitter which may occur in individual pulse transitions due to the modulation thereof with covert data. The term pulse transitions refer to leading and trailing edges of the pulses. Waveform 72 shows the same host waveform as waveform 70, except without the timing jitter 71. Waveform 74 shows an example of a reference signal useful for decoding the covert data in waveform 70. FIG. 6B is a variation of FIG. 6A showing a modulated host waveform 76 along with reconstructed waveform 72, and reference waveform 74. Host waveform 76 shows two pulses 75, 77 having leading and trailing edges which are aligned with the pulses of reference waveform 74. Waveform 76 further shows a center pulse having a leading edge 78 which is advanced and a trailing edge 79 which is delayed which misalignment represents data as depicted in the graph of FIG. 5.

Figure 7:
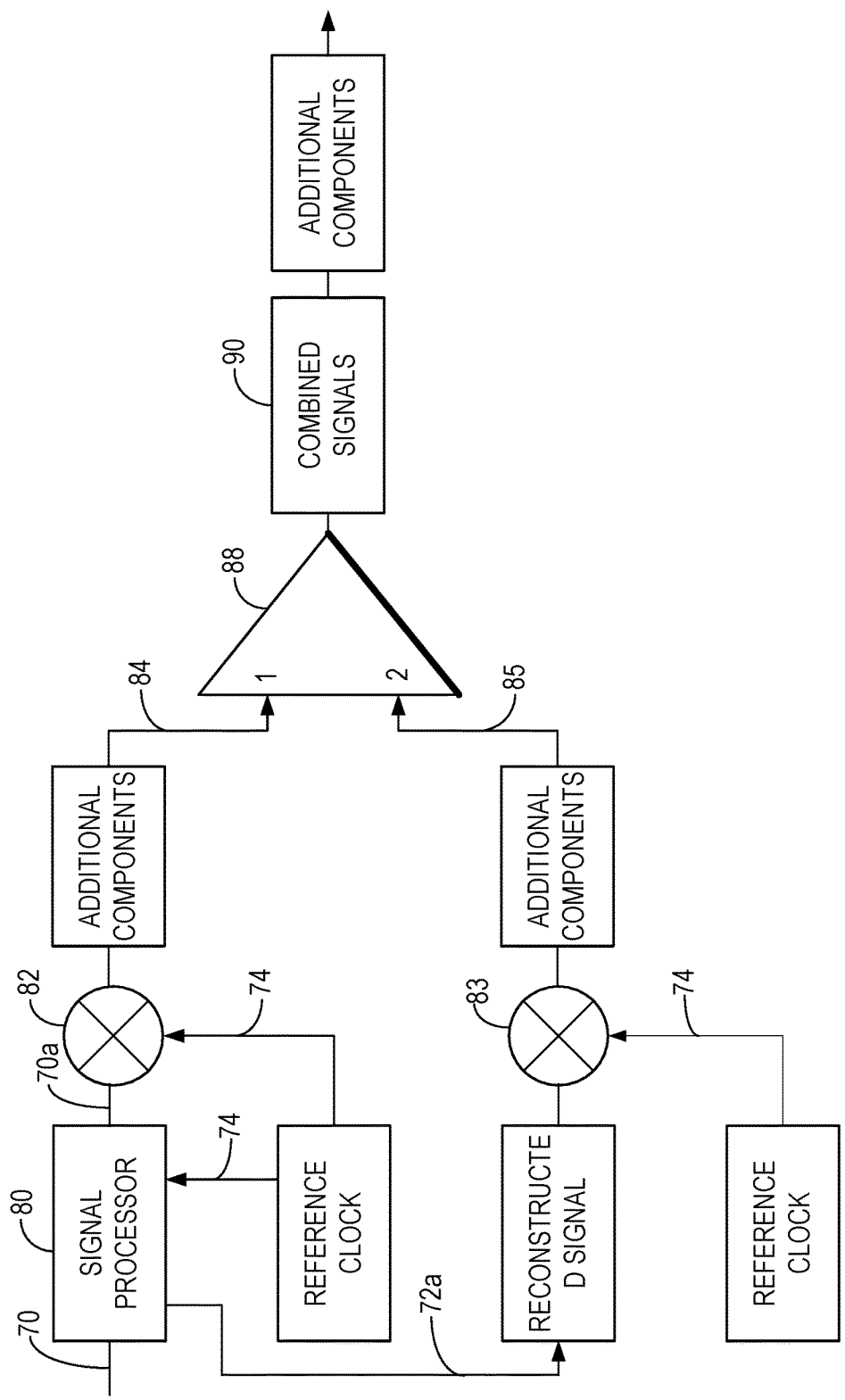
FIG. 7 is a block diagram of a circuit constructed in accordance with one embodiment of the present invention.

FIG. 7 is a block diagram of a circuit constructed according to the present invention. A processing circuit 80 receives the incoming encoded waveform 70 of FIG. 6A along with the reference clock signal 74. Processing circuit 80 reconstructs a copy 72a of the incoming waveform 70 which copy does not include the timing variations or jitter of received waveform 70. This reconstructed waveform 72a is substantially identical to waveform 72 of FIG. 6A in that it replicates the nominal digital data present in host waveform 70. Waveform 72a is reconstructed using the reference signal 74 and thus has the stability of the original host signal prior to the addition of the non-persistent channel. Both the original host signal 70 and the reconstructed host signal 72a are simultaneously coupled to phase detectors 82, 83 along with identical copies of reference signal 74. Processing circuit 80 necessarily includes a slight delay for host signal 70 due to the reconstruction process. This delay enables phase matching between host signal 70 and reconstructed signal 72 a in their respective phase detectors 82, 83. The outputs 84, 85 of phase detectors 82, 83 are coupled to a comparator 88 which subtracts one signal from the other, resulting in a combined signal 90.

Figure 8:
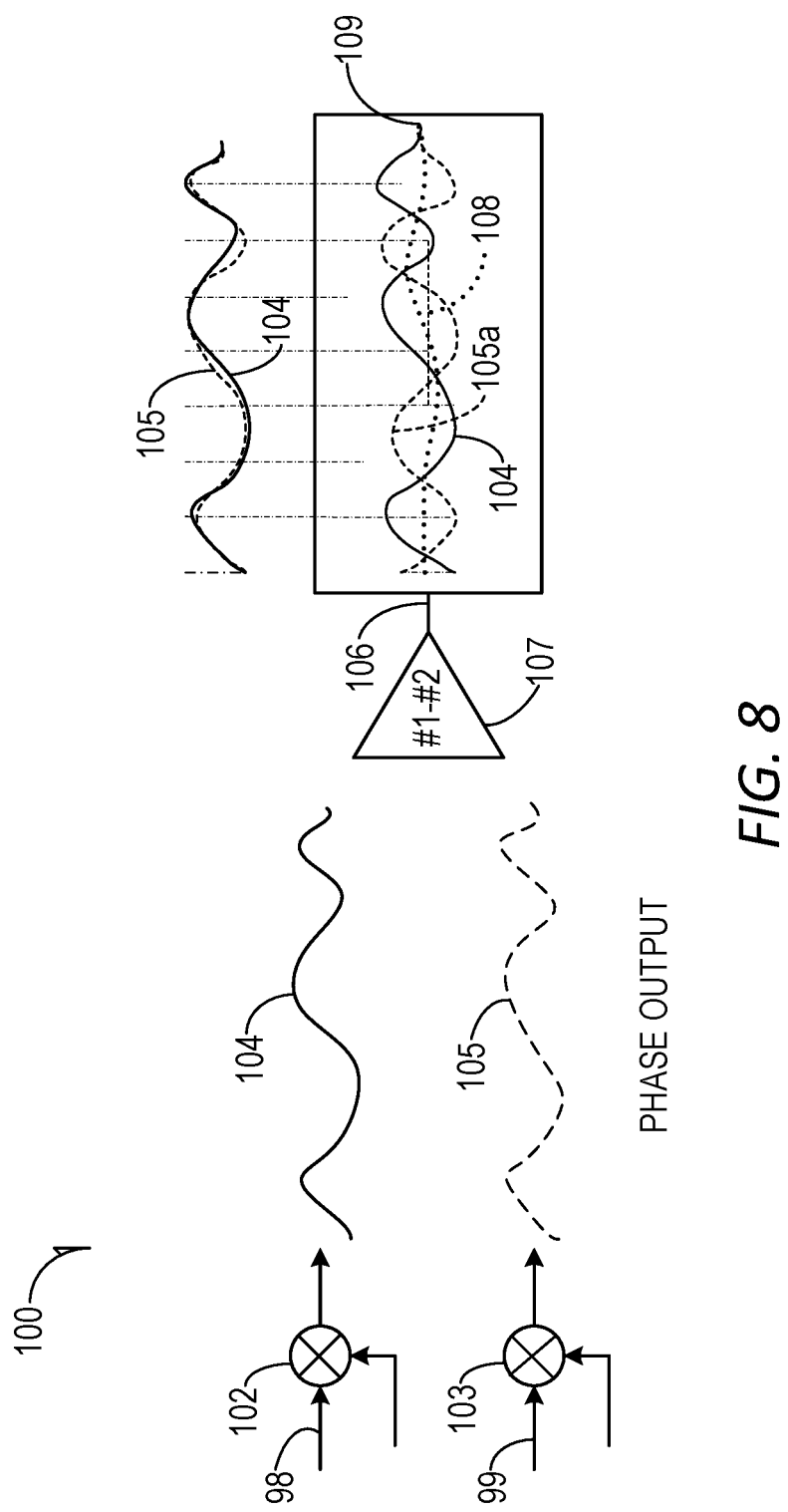
FIG. 8 is a graphic depiction of the application of one embodiment of the present invention.

FIG. 8 is a graphic depiction 100 of the application of the present invention to analog waveforms. A pair of phase detectors 102, 103 provide waveforms 104, 105 as a result of phase detecting an analog host signal 98 against a reconstructed copy 99. Waveforms 104, 105 are shown as overlaid in the upper right portion of the figure, and further shown as subtracted as they would represent the output 106 of comparator 107 waveform. Waveform 105 is subtracted by comparator 107 and is therefore inverted as waveform 105a in the output signal 106. The resulting difference between waveforms 104 and 105 is shown as waveform 108. Portions of waveform 108 extending above zero line 109 could represent a logical "1" and portions of waveform 108 extending below zero line 109 could represent a logical "0".

The present application, METHOD AND SYSTEM FOR NON-PERSISTENT COMMUNICATION is being filed on the same day as and in conjunction with related applications: METHODS FOR ENCRYPTION OBFUSCATION; SYSTEM AND METHOD TO DETECT TIME-DELAYS IN NON-PERIODIC SIGNALS; and METHOD AND SYSTEM FOR NON-PERSISTENT REAL-TIME ENCRYPTION KEY DISTRIBUTION, which applications all share some common inventors herewith, and the contents of which are all hereby incorporated herein in their entirety.

The present invention is illustratively described above in reference to the disclosed embodiments. Various modifications and changes may be made to the disclosed embodiments by persons skilled in the art without departing from the scope of the present invention as defined in the appended claims.

What is claimed is:

1. A method for encoding modulating data in a carrier signal, the method comprising:
    modulating timing jitter of the carrier signal having timing jitter of a given level with a first data signal to produce a modulated carrier signal wherein modulating the timing jitter of the carrier signal with the first data signal comprises varying timing in the carrier signal in response to the first data signal, wherein variations in the timing are smaller than a sampling period for detection and capture of an encoded modulated carrier signal;
    encoding the modulated carrier signal with a second data signal to produce the encoded modulated carrier signal; and
    transmitting the encoded modulated carrier signal.

2. The method of claim 1, wherein the encoded modulated carrier signal is a regenerated version of the second data signal, wherein the regenerated version has at least one frequency component with lower phase noise than the second data signal from which the regenerated version was created, and wherein the encoded modulated carrier signal was regenerated by using a frequency reference from a high stability oscillator that has a level of stability that is greater than the level of stability of the second data signal.

3. The method of claim 1, wherein the first data signal is configured to be recovered from the timing jitter of the encoded modulated carrier signal by sensing variations in timing of the encoded modulated carrier signal by comparison of the encoded modulated carrier signal to a first reference signal that has a level of stability that is greater than the level of stability of the encoded modulated carrier signal.

4. The method of claim 1, wherein the first data signal represents covert data, the encoded modulated carrier signal is a digital signal, and the timing jitter comprises variations in pulse timing.

5. The method of claim 4, wherein the pulse timing variations comprise variations of one of a leading edge of digital pulses, a trailing edge of digital pulses or a pulse width of digital pulses.

6. The method of claim 5, wherein the digital pulses comprise marks and spaces, and wherein the pulse timing variations comprise variations in time position of the marks and spaces.

7. The method of claim 1, wherein the encoded modulated carrier signal is a periodic waveform or a non-periodic waveform, and the timing variations are performed by modulating the phase of at least one frequency component of the carrier signal.

8. The method of claim 1 wherein the encoded modulated carrier signal is a periodic waveform or a non-periodic waveform, and the modulated timing jitter comprises the timing variations of one of a particular bit represented by the waveform or of a plurality of bits represented by the waveform.

9. The method of claim 8 wherein the plurality of bits are consecutive or non-consecutive.

10. A transmitter for surreptitious communication of data comprising:
    a high stability oscillator configured to generate a frequency reference as a carrier signal with at least one frequency component that has a level of stability that is greater than a level of stability of a receiver to which the communication is configured to be surreptitious;
    a modulator coupled to the high stability oscillator to modulate the carrier signal with a first data signal; and
    an encoder coupled to the modulator to encode the modulated carrier with a second data signal.

11. The transmitter of claim 10, wherein the carrier is modulated with the first data signal either by modulating the high stability oscillator, wherein the high stability oscillator generates a frequency reference for carrier signal generation, or by modulating the carrier signal after the carrier signal is generated by an unmodulated high stability oscillator.

12. The transmitter of claim 10, wherein the carrier signal is a frequency tone that has a level of stability that is greater than the level of stability of the receiver to which the communication is configured to be surreptitious.

13. The transmitter of claim 10, wherein the carrier signal is a periodic or non-periodic waveform that has a level of stability that is greater than the level of stability of the receiver to which the communication is configured to be surreptitious.

14. The transmitter of claim 10, wherein the first data signal is configured to be decoded from the timing jitter of the encoded modulated carrier signal by sensing variations in the timing of the encoded modulated carrier signal by comparison of the encoded modulated carrier signal to a first reference signal that has a level of stability that is greater than a level of stability of the encoded modulated carrier signal.

15. The transmitter of claim 14, wherein variations in the timing are smaller than a sampling period for detection and capture of the encoded modulated carrier signal.

16. The transmitter of claim 10, wherein the modulator is configured to modulate the carrier signal by modulating the phase of at least one of a plurality of frequency components of the carrier signal.

17. A receiver comprising:
- a decoder configured to receive an encoded modulated carrier signal, the encoded modulated carrier signal being modulated with a first data signal in timing jitter of the encoded modulated carrier signal;
- a high stability oscillator configured to generate a first reference signal that has a level of stability that is greater than the level of stability of the received encoded modulated carrier signal; and
- a demodulator coupled to the high stability oscillator to demodulate the encoded modulated carrier signal with the first reference signal to recover the first data signal.

18. The receiver of claim 17, wherein the first reference signal comprises the carrier signal without the first data signal modulated in the timing jitter of the carrier signal, and wherein the first data signal is recovered by comparison of the encoded modulated carrier signal to the carrier signal without the first data signal modulated in the timing jitter of the carrier signal.

19. The receiver of claim 18, wherein recovery of the first data signal comprises detecting timing variations in the encoded modulated carrier signal.

20. The receiver of claim 17, wherein the first reference signal is a frequency tone that has a level of stability that is greater than the level of stability of the encoded modulated carrier signal.

21. The receiver of claim 17, wherein the first reference signal is a regeneration of the carrier signal without the first data signal modulated in the timing jitter of the carrier signal, and that has a level of stability that is greater than the level of stability of the encoded modulated carrier signal.

22. The receiver of claim 17, wherein the first data signal is recovered from the timing jitter of the encoded modulated carrier signal by sensing variations in the timing of the encoded, modulated carrier signal by comparison to the first reference signal that has a level of stability that is greater than the level of stability of encoded modulated carrier signal.

23. The receiver of claim 19, wherein variations in the timing are smaller than a sampling period for detection and capture of the encoded modulated carrier signal.

* * * * *

UNITED STATES PATENT AND TRADEMARK OFFICE
CERTIFICATE OF CORRECTION

PATENT NO. : 9,900,031 B2
APPLICATION NO. : 15/155490
DATED : February 20, 2018
INVENTOR(S) : Kowalevicz et al.

Page 1 of 1

It is certified that error appears in the above-identified patent and that said Letters Patent is hereby corrected as shown below:

In the Specification

In Column 3, Line 40, delete "(GHz)," and insert --(GHz).-- therefor

In Column 5, Line 16, delete "72 a" and insert --72a-- therefor

In the Claims

In Column 8, Line 21, in Claim 22, delete "encoded," and insert --encoded-- therefor Signed and Sealed this
Fourth Day of June, 2019

Andrei Iancu
*Director of the United States Patent and Trademark Office*